Patented Oct. 13, 1953

2,655,528

UNITED STATES PATENT OFFICE 2,655,528

SULFUR TRIOXIDE COMPOUNDS OF PENTAALKYLGUANIDINES

William B. Hardy, Bound Brook, and Hans Z. Lecher, Plainfield, N. J., assignors to American Cyanamid Company, New York, N. Y., a corporation of Maine No Drawing. Application November 1, 1951, Serial No. 254,452

8 Claims. (Cl. 260—500)

1

This invention relates to a new series of chemical compounds, the sulfur trioxide addition products of pentaalkylguanidines.

Sulfur trioxide compounds of strong bases have been desirable for use in a number of sulfation reactions, e. g. in the esterification of phenolic compounds. We have found that it is possible to prepare sulfur trioxide addition products of pentaalkylguanidines and particularly those in which the alkyl groups have from one to four carbon atoms. These compounds show excellent stability and can be used for various sulfation reactions.

It appears probable that the addition products of pentaalkylguanidines and sulfur trioxide are internal salts which can be represented by the following formula:

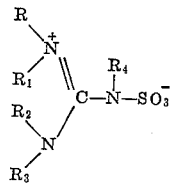

where R, R₁, R₂, R₃ and R₄ stand for the same or different alkyl groups of one to four carbon atoms. While it is believed that the reaction products are probably internal salts and the above formula is the most probable, this has not been proved conclusively and therefore the present invention is not limited to any theory of the exact formula of the compounds. The alkyl substituents may be identical, such as in pentamethylguanidine and pentaethylguanidine, or they may be different, such as in 1,1,3,3-tetramethyl-2-ethylguanidine and in 1,1,2-trimethyl-3,3-diethylguanidine.

It is possible to prepare the new compounds of the present invention by the direct addition of sulfur trioxide on the pentaalkylguanidines, e. g. in an inert solvent, which is a normal procedure in preparing sulfur trioxide addition products of tertiary aliphatic amines. However, this process does not work as smoothly with the pentaalkylguanidines for reasons that are not understood. Therefore, we prefer to use a different process in which an exchange reaction is effected between the pentaalkylguanidine and the sulfur trioxide addition compound of a tertiary amine such as pyridine, trimethylamine, triethylamine, ethylmorpholine, etc. Preferably, the exchange reaction is effected in an inert, organic solvent. Thus, while the new compounds are not intended to be limited to any particular

2 method of preparation, in a more specific aspect the improved process is included within the scope of the present invention.

The preferred method of preparing the compounds of the present invention may be carried out easily in inert organic solvents, such as chlorobenzene, ethylene dichloride, chloroform, o-dichlorobenzene, dioxane, nitrobenzene, acetylene tetrachloride and toluene are typical. Products are readily recovered by conventional means and may be purified by recrystallization from organic solvents. They are also soluble in water and give solutions that show a much greater degree of stability than those of sulfur trioxide compounds of tertiary amines. They are particularly stable in alkaline medium, but the hydrolysis is accelerated by acids. This hydrolysis results in the formation of the corresponding pentaalkylguanidine acid sulfate.

The new compounds are useful in the preparation of sulfuric acid half esters of alcohols and phenolic compounds and in the preparation of sulfamic acids.

The invention will be further illustrated in the following specific examples, the parts being by weight unless otherwise specified:

Example 1

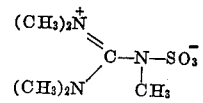

6.5 parts of pentamethylguanidine are added to a solution of 9.1 parts of the sulfur trioxide addition product of triethylamine in 33 parts of ethylene chloride, while the mixture is cooled and stirred. The thick white slurry is filtered and the crystalline solid is washed with cold ethylene chloride. An excellent yield is obtained. The product may be purified by recrystallization from ethylene chloride to give colorless crystals melting at approximately 203° C. The compound is very soluble in water to give a stable solution which is not acid to Congo Red or alkaline to Brilliant Yellow.

Example 2

The procedure of Example 1 is followed, substituting pentaethylguanidine for the pentamethylguanidine. A crystalline product is obtained having substantially the same properties as that of Example 1.

Example 3

The procedure of Example 1 is followed but the ethylene dichloride is replaced by an equal amount of dioxane.

We claim:

1. A sulfur trioxide compound of a pentaalkylguanidine, the alkyl groups of which contain not more than four carbon atoms.

2. The sulfur trioxide compound of pentamethylguanidine.

3. The sulfur trioxide compound of pentaethylguanidine.

4. A process of converting a pentaalkyl guanidine as defined in claim 1 into its sulfur trioxide compound by reacting it with the sulfur trioxide compound of a tertiary amine.

5. A process of converting a pentaalkylguanidine as defined in claim 1 into its sulfur trioxide compound by reacting it with the sulfur trioxide compound of a trialkylamine.

6. A process of converting a pentaalkylguanidine as defined in claim 1 into its sulfur trioxide compound by reacting it with the sulfur trioxide compound of triethylamine.

7. A process of converting pentamethylguanidine into its sulfur trioxide compound by reacting it with the sulfur trioxide compound of a trialkylamine.

8. A process of converting pentamethylguanidine into its sulfur trioxide compound by reacting it with the sulfur trioxide compound of triethylamine.

WILLIAM B. HARDY.
HANS Z. LECHER.

References Cited in the file of this patent

UNITED STATES PATENTS

| Number | Name | Date |
|---|---|---|
| 2,386,693 | Lecher et al. | Oct. 9, 1945 |
| 2,402,647 | Lecher et al. | June 25, 1946 |